(12) United States Patent
Baer

(10) Patent No.: US 6,822,657 B2
(45) Date of Patent: Nov. 23, 2004

(54) METHOD AND APPARATUS FOR IMPROVING IMAGE QUALITY IN DIGITAL CAMERAS

(75) Inventor: Richard L. Baer, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 382 days.

(21) Appl. No.: 09/928,187

(22) Filed: Aug. 10, 2001

(65) Prior Publication Data

US 2003/0030648 A1 Feb. 13, 2003

(51) Int. Cl.[7] .............................. G09G 5/02; G06K 9/00; H04N 1/46; G03F 3/08
(52) U.S. Cl. ...................... 345/589; 382/167; 358/504; 358/518; 358/521
(58) Field of Search .............................. 345/589, 645; 382/167, 252, 237; 358/504

(56) References Cited

U.S. PATENT DOCUMENTS

| | | | |
|---|---|---|---|
| 4,941,190 A | * 7/1990 | Joyce | 382/264 |
| 5,446,504 A | 8/1995 | Wada | 348/645 |
| 5,467,412 A | * 11/1995 | Capitant et al. | 382/167 |
| 5,568,192 A | * 10/1996 | Hannah | 348/222.1 |
| 5,805,213 A | * 9/1998 | Spaulding et al. | 348/222.1 |
| 5,898,509 A | * 4/1999 | Bianchi et al. | 358/483 |
| 6,486,915 B2 | * 11/2002 | Bell et al. | 348/362 |
| 6,694,051 B1 | * 2/2004 | Yamazoe et al. | 382/167 |
| 2003/0194128 A1 | * 10/2003 | Tan et al. | 382/167 |

* cited by examiner

Primary Examiner—Matthew C. Bella
Assistant Examiner—Anthony Blackman

(57) ABSTRACT

A method and apparatus for improving image quality in a digital imaging device such as a digital video or still camera. A method for improving image quality of the device has steps of providing a digital image signal, and selecting a color corrector based, at least in part, on a signal-to-noise ratio of the digital image signal. The method and apparatus enables the image quality of an electronic output image output by the digital imaging device to be optimized over a wide range of signal values.

19 Claims, 2 Drawing Sheets

METHOD AND APPARATUS FOR IMPROVING IMAGE QUALITY IN DIGITAL CAMERAS

BACKGROUND OF THE INVENTION

1. Technical Field of the Invention

The present invention relates generally to the image signal processing field; and, more particularly, to a method and apparatus for improving image quality in digital cameras by adjusting color saturation according to the signal-to-noise ratio of raw image sensor output.

2. Description of Related Art

In a digital camera, such as a digital video or still camera, light from an object that is focused on an image sensing unit of the camera is converted into an electronic output image of the object that is suitable for display, transmission or storage. The image sensing unit converts the light pattern focused on it into an array of voltage samples that are converted to a digital signal. The digital signal is then processed by a digital image processor that renders the electronic output image. The digital image processor typically implements several different stages of image processing including, for example, image reconstruction from color mosaic samples, white-point adjustment, color correction, noise filtering, tone mapping and image compression.

In digital cameras, the digital image processor utilizes a color correction matrix for color correction. In most digital still cameras, the color correction matrix is determined in advance, and is usually selected to provide the most pleasing color reproduction under good lighting conditions.

In digital cameras also, the signal-to-noise ratio of the output of the image sensing unit decreases at low signal levels resulting in a noisy image, and the signal-to-noise ratio can be further degraded by the application of the color correction matrix resulting in an even noisier image.

Color correction matrices that have been used in known digital cameras are usually optimized for color quality at the expense of signal-to-noise ratio. In some of these cameras, the matrices decrease the signal-to-noise ratio by amplifying image noise; while in other cameras, noise amplification is avoided by switching to monochrome operation at low signal levels. In most known digital cameras, accordingly, images created at low signal levels tend to be either colorful and noisy, or colorless and less noisy.

U.S. Pat. No. 5,446,504 describes a method and apparatus for varying color saturation as a function of signal level in a digital camera. FIG. 2 of the patent illustrates a circuit that can be used to vary the color saturation over a full range from complete saturation to zero saturation, i.e., monochrome. In the method described in the patent, the color saturation is varied as a function of luminance level, and the saturation is decreased in dark areas of a scene.

A method such as described in U.S. Pat. No. 5,446,504 is not fully satisfactory for several reasons. Initially, in the method of the patent, the luminance signal controls the selection of the color correction matrix; however, the method operates only on relative luminance signal levels. In the method of the patent, accordingly, the color correction matrix must be varied throughout the image, depending on the relative luminance signal. Also, as indicated above, the electronic output image tends to be noisy or colorless at low signal levels.

What is needed is a digital imaging device, such as a digital camera, that has a color correction matrix that is capable of effectively correcting color over a wide range of signal levels.

SUMMARY OF THE INVENTION

The present invention provides a method and apparatus for improving image quality in a digital imaging device such as a digital camera., over a wide range of signal levels. A method for improving image quality according to the present invention comprises providing a digital image signal, and selecting a color corrector to correct the digital image signal. The color corrector is selected based, at least in part, on a signal-to-noise ratio of the digital image signal.

In the course of the present invention, it has been discovered that image quality can be optimized over a wide range of digital image signal levels in a digital imaging device, such as a digital camera, by correcting the color of the digital image signal utilizing information about the signal-to-noise ratio of the digital image signal.

In accordance with an embodiment of the present invention, the digital image signal comprises an output from an image sensing unit, and a signal-to-noise ratio estimator computes an estimate of the mean signal-to-noise ratio of the output digital image signal The color corrector, which may be a color correction matrix, is selected based on the estimated mean signal-to-noise ratio.

The estimate of the mean signal-to-noise ratio, according to a further embodiment of the invention, is computed from the mean level of the image sensing unit output, operating parameters of the image sensing unit and characteristics of the image sensing unit based on an a priori model of image sensing unit noise. The appropriate color corrector is then selected based on the computed estimate of the mean signal-to-noise ratio.

According to a further embodiment of the invention, the a priori model includes electronic noise sources ahead of and behind the gain stage of the image sensing unit, and photon shot noise. Other sources of noise, such as dark current could also be included in the model, if desired.

As mentioned previously, known digital cameras select a color correction matrix based on relative luminance signal levels. The degree to which the luminance signal has been amplified is unknown, and the characteristics and operating conditions of the image sensing unit are unknown. Consequently, it is not possible in known cameras to determine the signal-to-noise ratio of the digital image signal from the luminance level.

In accordance with an embodiment of the present invention, on the other hand, operating parameters are used to determine the absolute luminance signal level; and the signal-to-noise ratio is determined from the absolute signal level and characteristics of the image sensing unit. Because, in the present invention, the mean signal level is used to compute a mean signal-to-noise ratio; a single, selected color corrector can be used to correct the entire image, rather than having to vary the color corrector throughout the image. As a result, image quality of the digital image can be optimized over a wide range of signal values.

According to further embodiments of the invention, a look-up table can be used to implement the color corrector selection, or an analytical formula can be used to determine the color corrector by interpolating between two extreme values.

According to embodiments of the present invention, the image sensing unit comprises a CMOS (Complementary Metal Oxide Semiconductor) image sensor or a CCD image sensor; and the apparatus comprises a digital video or still camera. Furthermore, the invention provides embodiments with other features and advantages in addition to or in lieu of those discussed above. Many of these features and advantages are apparent hereinafter in conjunction with the following drawings and detailed description of exemplary embodiments of the invention.

DETAILED DESCRIPTION OF THE EXEMPLARY EMBODIMENTS OF THE INVENTION

Figure 1:
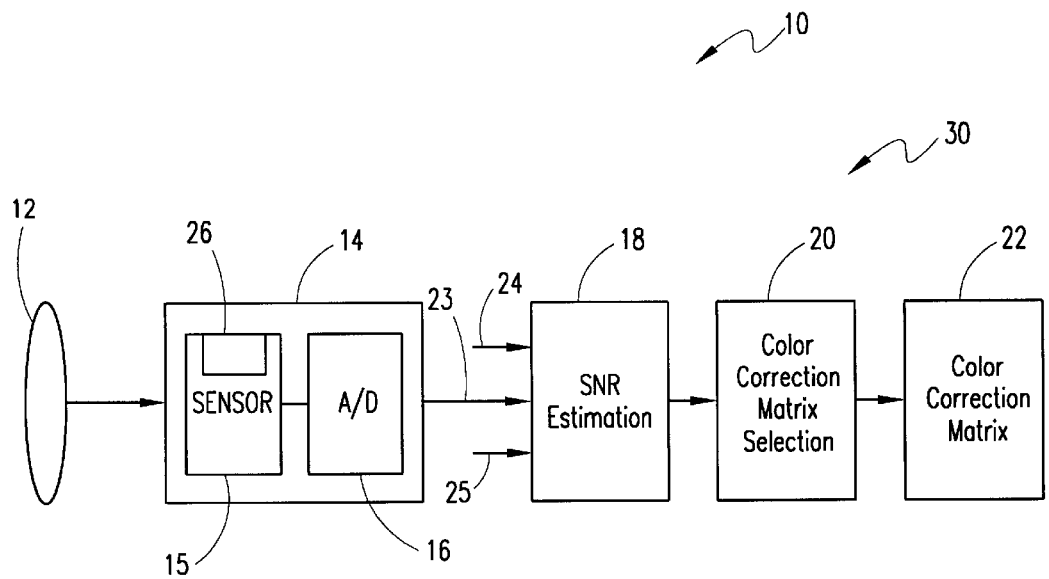
FIG. 1 is a block diagram that schematically illustrates a digital imaging device according to an exemplary embodiment of the present invention.

FIG. 1 is a block diagram that schematically illustrates a digital imaging device according to an exemplary embodiment of the present invention. The digital imaging device is generally designated by reference number 10 and comprises a digital camera such as, for example, an electronic video camera or an electronic still camera.

As shown in FIG. 1, the digital imaging device includes an optical system 12, represented as a lens, for receiving light from an object and for focussing the light onto an image sensing unit 14. The image sensing unit 14 includes an image sensor 15 that converts the light pattern focussed thereon into an array of analog voltage samples representative of the light pattern, and an analog to digital converter 16 that converts the array of analog voltage samples into a digital image signal. Although illustrated as separate components in FIG. 1, the a/d converter 16 can be incorporated in the image sensor 15. Image sensor 15 preferably comprises a CMOS (Complementary Metal Oxide Semiconductor) image sensor or a CCD (Charge Coupled Device) image sensor, although it should be understood that it is not intended to limit the present invention to any particular type of image sensor.

The digital image signal output from the image sensing unit 14, and represented by arrow 23 in FIG. 1, is received by a digital image processor, generally designated by reference number 30. Digital image processor 30 functions to process the digital image signal so as to render an electronic output image representative of the object. In effect, the digital imaging device 10 functions to convert the light focussed onto the image sensing unit thereof into an electronic output image that is in a form suitable to be displayed, transmitted or stored.

The digital image processor 30 typically implements many different stages of image processing including, for example, image reconstruction from color mosaic samples, white-point adjustment, color correction, noise filtering, tone mapping and image compression. The present invention is primarily directed to the color correction processing stage; and to accomplish color correction, the digital image processor includes a color correction matrix, schematically illustrated by box 22 in FIG. 1.

As discussed previously, in most digital cameras, the color correction matrix is determined in advance, and is usually selected to provide the most pleasing color reproduction under good lighting conditions. The color correction matrices used in most known digital cameras are selected to optimize color quality at the expense of signal-to-noise ratio. The selected matrices decrease the signal-to-noise ratio by amplifying image noise or by switching to monochrome operation at low signal levels. These approaches result in an image that, at low signal levels, is either colorful and noisy or colorless and less noisy.

It has been discovered, however, that image quality can be optimized over a wide range of signal levels in a digital imaging device, such as a digital camera, by selecting a color correction matrix that takes into account information about the signal-to-noise ratio of the output image signal of the image sensing unit 14.

In particular, referring still to FIG. 1, to select the appropriate color correction matrix 22, digital image processor 30 includes a signal-to-noise ratio estimator 18 (SNR estimator) and a color correction matrix selector 20. In general, the SNR estimator functions to compute an estimate of the mean signal-to-noise ratio of the digital image signal from the mean value of the raw image signal output from the image sensing unit illustrated at 23; and from image sensing unit operating parameters illustrated at 24, and image sensing unit characteristics illustrated at 25. The computed estimate of the mean signal-to-noise ratio is then used to select the appropriate color correction matrix for correcting color in the digital image signal.

More particularly, the SNR estimator computes an estimate of the mean signal-to-noise ratio from the mean level of the raw output signal from the image sensing unit, image sensing unit operating parameters and image sensing unit characteristics, based on an a priori model of image sensor unit noise. In a preferred embodiment, for example, the model includes electronic noise sources ahead of and behind the gain stage of the image sensing unit; and, in addition, photon shot noise. Other sources of noise could also be used if desired in the model including, for example, dark current.

The formula for computing the signal-to-noise ratio is:

$$\{SNR\} = (\{S\}/G)/(\mathrm{sqrt}[k\{S\}/G] + N1 + N2/G)$$

In this expression, $\{S\}$ is the mean signal level of the image sensor unit output; and "G" is the amplifier gain, which is one of the image sensing unit operating parameters. If dark current is included in the model, two other image sensing unit operating parameters would be required: the exposure period and the temperature. "k", "N1" and "N2" are image sensing unit characteristics that can be determined from the manufacturer's specifications, or from independent measurements of the image sensing unit performance. These measurements might include, for example, tests of the noise output with no illumination at various gain settings. "k" is the conversion gain of the image sensing unit (the ratio of the pixel voltage to the amount of charge that has been collected). "N1" is the electronic noise that is contributed ahead of a variable amplifier stage of the image sensing unit, and "N2" is the electronic noise that is contributed after the variable amplifier stage. The square root term in the formula estimates the contribution of photon shot noise.

Figure 2:
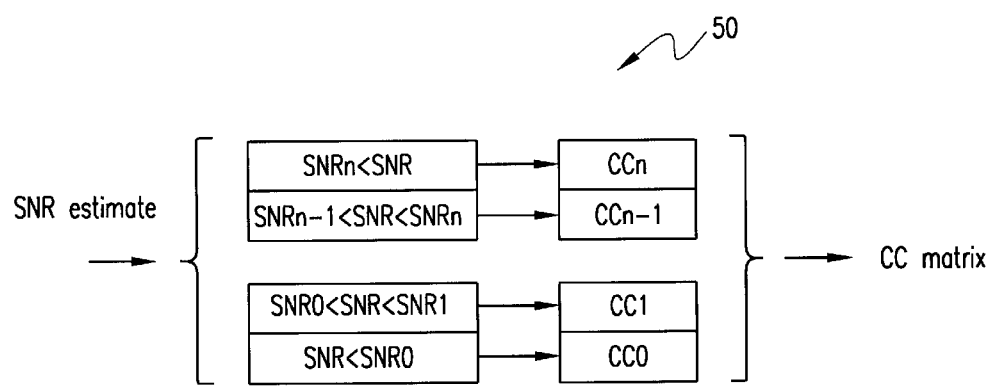
FIG. 2 is a look-up table that may be used to implement selection of a color correction matrix of the digital imaging device of FIG. 1 according to another embodiment of the invention.

The color correction matrix selector 20 selects a color correction matrix based upon the mean value of the signal-to-noise ratio estimated by the SNR estimator 18. In an exemplary embodiment of the invention, a look-up table is used to implement the selection. A suitable look-up table 50 is illustrated in FIG. 2.

The color correction matrices that appear in the table are chosen based upon studies of observer preferences of color saturation as a function of signal-to-noise ratio. Alternatively, an analytical formula could be used to determine the color correction matrix by interpolating between two extreme values. An example of such an analytical formula is:

$$CC=a*CC\_LowSat+(1-a)*CC\_HighSat$$

where $$a=1/(1+SNR/SNR\_0)$$

In this formula, CC is the color correction matrix. CC_LowSat and CC_HighSat are color correction matrices for the two limiting cases of low color saturation and high color saturation, respectively. SNR is the estimated SNR, and SNR_0 is some SNR threshold value. The formula provides linear interpolation between the extreme values.

In the case of a CMOS image sensor 15, the logic required to extract information regarding characteristics of the digital image signal can be included in the image sensor. In the case of a CCD image sensor 15, the logic can be included in an analog front-end chip of the image sensor. For either image sensor, extraction of the signal characteristic information can also be performed inside the digital image processor 30.

The dominant sources of noise in an image sensing unit are independent of signal level at low signal levels. Consequently, at low signal values, information about the signal-to-noise-ratio may be inferred from the signal level of the digital image signal output by the image sensing unit.

In the case of a three-color system, the color correction, i.e., a color transformation, is accomplished by a 3-by-3 color correction matrix, which generally contains negative elements. The negative elements reduce the signal levels in the transformed space. The noise components, however, are not reduced because the noise processes of the raw sensor color channels are uncorrelated. The noise terms add in power and the signal terms subtract in power.

This effect can be observed in a transformation from ideal CMY (cyan, magenta, yellow) to ideal RGB (red, green, blue). Assume that C=B+G, M=B+R and Y=R+G. The corresponding transformation matrix from CMY to RGB is:

$$\begin{vmatrix} R \\ G \\ B \end{vmatrix} = 0.5 * \begin{vmatrix} -1 & 1 & 1 \\ 1 & -1 & 1 \\ 1 & 1 & -1 \end{vmatrix} \begin{vmatrix} C \\ M \\ Y \end{vmatrix}$$

Assume also that the input channels all have signal level "S" and noise level "N", and that the noise processes are uncorrelated. The resulting signal level in the display space is 0.5*S, while the noise level is 0.5*sqrt (3)*N. The signal-to-noise ratio has, accordingly, been reduced by a factor of 1/sqrt (3).

Alternatively, the matrix coefficients could be adjusted to performing a transformation to monochrome instead of color. In this case, the color transformation matrix is simply:

$$\begin{vmatrix} R \\ G \\ B \end{vmatrix} = 0.33 * \begin{vmatrix} 1 & 1 & 1 \\ 1 & 1 & 1 \\ 1 & 1 & 1 \end{vmatrix} \begin{vmatrix} x1 \\ x2 \\ x3 \end{vmatrix}$$

In this matrix, the signal terms add directly while the noise terms add only in power. The output signal-to-noise ratio is increased by a factor of sqrt (3).

The degree of color saturation can be varied from anywhere between full color and monochrome by linearly interpolating between the two transformation matrices given above. The signal-to-noise ratio of the electronic output image can be varied from 1/sqrt (3) to sqrt (3) times the signal-to-noise ratio of the sensor output signal. Under poor lighting conditions, when the signal-to-noise ratio of the sensor output signal is low, a color correction matrix with low saturation can be chosen to maximize the signal-to-noise ratio of the electronic output image. Under good lighting conditions, a color correction matrix with high saturation can be chosen to maximize the colorfulness of the electronic output image. In general, the color correction matrix should be chosen on the basis of prior experimentation to maximize the perceptual image quality at each signal level.

Figure 3:
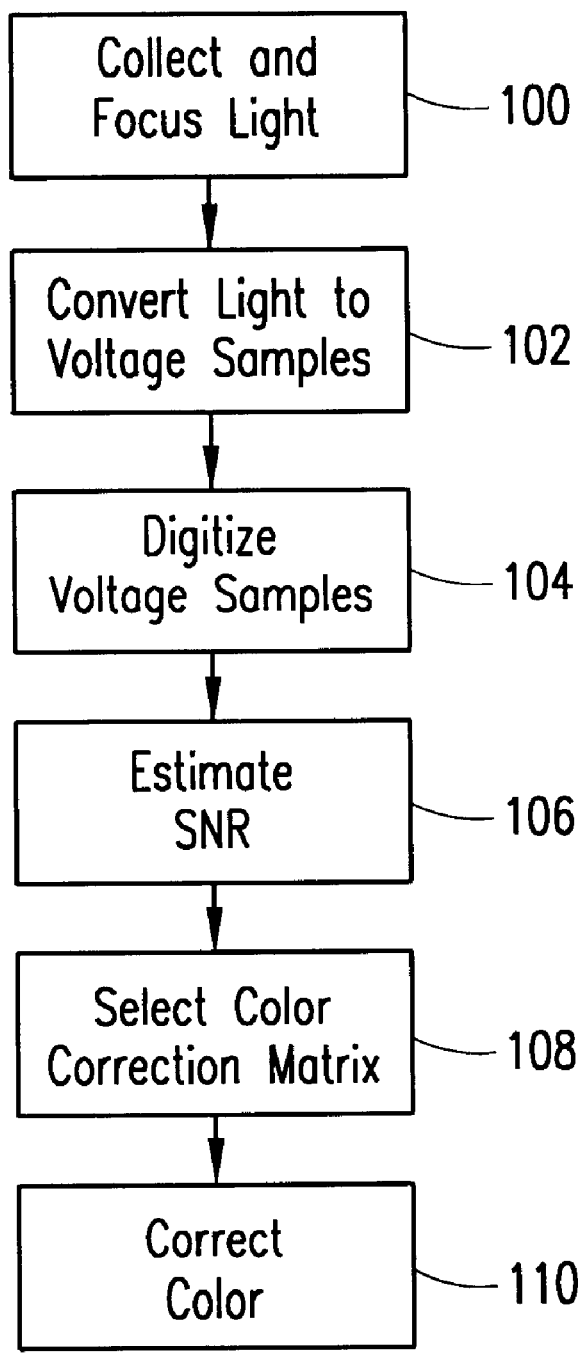
FIG. 3 is a flow chart that illustrates steps of a method for improving image quality in a digital imaging device according to another exemplary embodiment of the present invention.

FIG. 3 is a flow chart that schematically illustrates steps of a method for improving image quality in a digital imaging device according to another embodiment of the present invention. In the method, light from an object is first collected by the optical system of a digital imaging device and focussed on an image sensing unit in step 100. The image sensing unit converts the image pattern focussed thereon into an array of analog voltage samples in step 102, and the analog voltage samples are converted to a digital image signal of the image sensing unit in step 104. The digital image signal is received by a digital image processor and, in step 106, a signal-to-noise ratio of the signal is determined. An appropriate color correction matrix is selected in step 108 based on the determined signal-to-noise ratio. The digital image processor then outputs a color-corrected electronic output image in step 110.

While what has been described constitutes exemplary embodiments of the invention, it should be recognized that the invention can be varied in numerous ways without departing from the scope thereof. Accordingly, it should be recognized that the invention should be limited only insofar as is required by the scope of the following claims.

What is claimed is:

1. A method for improving image quality in a digital imaging device, comprising:
    providing a digital image signal;
    estimating a signal-to-noise ratio of the digital image signal; and
    selecting a color corrector based, at least in part, on said estimated signal-to-noise ratio of the digital image signal.

2. The method according to claim 1, wherein said estimated signal-to-noise ratio comprises an estimate of a mean signal-to-noise ratio of the digital image signal.

3. The method according to claim 2, wherein said digital image signal is output from an image sensing unit, and wherein said estimated signal-to-noise ratio is based on a mean output signal level of the image sensing unit, at least one operating parameter of the image sensing unit, and at least one characteristic of the image sensing unit based on an a priori model of image sensing unit noise.

4. The method according to claim 3, wherein said model includes at least one electronic noise source.

5. The method according to claim 4, wherein said at least one electronic noise source includes electronic noise sources ahead of and behind a gain stage in said image sensing unit.

6. The method according to claim 3, wherein said model includes a dark current noise source.

7. The method according to claim 3, wherein said model includes photon shot noise.

8. The method according to claim 3, wherein said at least one operating parameter includes a gain of an amplifier of the image sensing unit.

9. The method according to claim 3, wherein said at least one operating parameter includes exposure period and temperature.

10. A digital imaging processing apparatus, comprising:
an image sensing unit for generating a digital image signal; and
a digital image signal processor for processing the digital image signal and for providing an electronic output image, the digital image signal processor including:
a signal-to-noise ratio estimator for estimating a signal-to-noise ratio of said digital image signal; and
a color corrector selector for selecting a color corrector to correct a color of said electronic output image based, at least in part, on a said estimated signal-to-noise ratio of said digital image signal.

11. The apparatus according to claim 10, wherein said estimated signal-to-noise ratio comprises an estimate of a mean signal-to-noise ratio of said digital image signal.

12. The apparatus according to claim 11, wherein said signal-to-noise ratio estimator includes means for determining a mean level of the digital image signal, at least one operating parameter of said image sensing unit, and at least one characteristic of said image sensing unit, and wherein said signal-to-noise ratio estimator computes an estimate of said mean signal-to-noise ratio of the digital image signal based on said mean level of the digital image signal, said at least on operating parameter and said at least one characteristic.

13. The apparatus according to claim 10, wherein said image sensing unit comprises a CMOS image sensor.

14. The apparatus according to claim 10, wherein said image sensing unit comprises a CCD image sensor.

15. The apparatus according to claim 10, wherein said digital imaging device comprises a digital camera.

16. The apparatus according to claim 10, wherein said color corrector comprises a color correction matrix, and wherein said color corrector selector comprises a color correction matrix selector.

17. The apparatus according to claim 10, wherein said image sensing unit comprises an image sensor for converting an image pattern focussed thereon into an array of voltage samples, and an analog to digital converter or converting the array of voltage samples to said digital image signal.

18. The apparatus according to claim 17, wherein said analog to digital converter is incorporated in said image sensor.

19. The method according to claim 1, wherein said color corrector comprises a color correction matrix.

* * * * *